United States Patent
Mecner et al.

(10) Patent No.: US 9,283,885 B2
(45) Date of Patent: Mar. 15, 2016

(54) METHOD OF MANUFACTURE OF A LIGHTING DEVICE

(71) Applicant: Varroc Lighting Systems, s.r.o., Senov u Noveho Jicina (CZ)

(72) Inventors: Petr Mecner, Opava (CZ); Jindrich Chylek, Bilovec (CZ); Daniel Martincik, Novy Jicin-Loucka (CZ); Dieter Niessen, Erkelenz (DE); David Janecek, Koprivnice (CZ)

(73) Assignee: VARROC LIGHTING SYSTEMS, S.R.O. (CZ)

( * ) Notice: Subject to any disclaimer, the term of this patent is extended or adjusted under 35 U.S.C. 154(b) by 64 days.

(21) Appl. No.: 14/327,166

(22) Filed: Jul. 9, 2014

(65) Prior Publication Data
US 2015/0013135 A1    Jan. 15, 2015

(30) Foreign Application Priority Data
Jul. 12, 2013  (CH) ..................... 2013-554

(51) Int. Cl.
*B62D 65/16* (2006.01)
*B60Q 1/04* (2006.01)
*B60Q 1/26* (2006.01)
*B62D 65/02* (2006.01)

(52) U.S. Cl.
CPC .............. *B60Q 1/0408* (2013.01); *B60Q 1/045* (2013.01); *B60Q 1/2638* (2013.01); *B62D 65/028* (2013.01); *B62D 65/16* (2013.01); *B60Q 1/0433* (2013.01); *B60Q 1/0441* (2013.01); *B60Q 2200/32* (2013.01); *Y10T 29/4978* (2015.01); *Y10T 29/49764* (2015.01); *Y10T 29/49771* (2015.01); *Y10T 29/49778* (2015.01)

(58) Field of Classification Search
CPC ................... Y10T 29/49771; Y10T 29/49778; Y10T 29/4978; B62D 65/16; B60Q 1/0433; B60Q 1/0441; B60Q 1/045
See application file for complete search history.

(56) References Cited

U.S. PATENT DOCUMENTS

2004/0160784 A1 *  8/2004  Park ................. B62D 65/16
                                                  362/507

FOREIGN PATENT DOCUMENTS

| DE | 102004005978 A1 | 9/2005 |  |
|---|---|---|---|
| EP | 1939076 A1 | 7/2008 |  |
| WO | WO 2004012961 A1 * | 2/2004 | ........... B60Q 1/0433 |
| WO | WO 2008101451 A1 * | 8/2008 | ........... B60Q 1/0064 |

* cited by examiner

*Primary Examiner* — Jermie Cozart
(74) *Attorney, Agent, or Firm* — Cantor Colburn LLP

(57) ABSTRACT

A method of manufacturing a lighting device comprising a body of headlamp or rear light of a motor vehicle that comprises a housing enclosing a transparent cover wherein: 1) the body is clamped in a fixture and a set of actual positions of control points of the cover or housing are measured; 2) the measured actual positions of the control points are compared in a three-dimensional model with a respective calculated tolerance space of control points bounded by permissible deviations from nominal positions; 3) if the actual positions of all the control points do not match up within the respective calculated tolerance space of control points, a set of corrected positions is identified and selected; 4) determining corresponding corrected positions of the associated locating elements for attachment of the lighting device from the corrected positions of the control points; and 5) joining the locating elements in the corrected positions.

9 Claims, 4 Drawing Sheets

METHOD OF MANUFACTURE OF A LIGHTING DEVICE

CROSS-REFERENCES TO RELATED APPLICATIONS

This patent application claims priority to Czech Republic Patent Application Serial No. PV 2013/554 filed on Jul. 12, 2013, which is incorporated herein by reference in its entirety.

BACKGROUND OF THE INVENTION

The invention concerns a method of manufacture of a lighting device, especially a headlamp or rear light of motor vehicles, whose housing with light source is closed by a transparent cover.

With the improvement in the precision and perfection of assembly of vehicles the demands are also growing for the accuracy of attachment of the headlamp to the body of the vehicle. It is necessary that the headlamps and signal lights for motor vehicles be manufactured with less standard deviation from the nominal position and also with a uniform distribution of deviations over the entire circumference of the lamp.

A method for manufacture of a headlamp for a precise installation is known from EP1939076, whose purpose is to do away with the need for further adjustment of the position of the headlamp after assembly on the frame of the vehicle. The assembled headlamp is placed in the machining station such that the reference points of the transparent diffusing cover of the head lamp are set against control elements of the machining station whose positions correspond to the correct spatial arrangement, next a sensor determines the effective position of the first grasping means of the housing of the headlamp with respect to the position of the control elements, then the control unit of the machining station compares the determined effective position of the first retaining means with its nominal position which is needed for mating with a coupled second retaining means of the vehicle frame and finally the first retaining means is machined by removal of at least part of its excess to enable a mating with the second retaining means. The drawback of the solution according to EP1939076 is the machining of the first retaining means of the housing, which is spatially difficult, insufficiently precise, requires costly machining equipment and tooling, and produces a lot of unwanted wastes which need to be comprehensively disposed of.

There is known from DE102004005978 a method of mounting of a headlamp on a mounting support, located in the front part of a vehicle and provided with openings for precision fastening of the headlamp. The mounting support is placed on a mounting rack, whose connection points correspond to the frame of the vehicle. On the mounting support, the precise positions of the connection points for fastening of the headlamp are determined by measurement and transmitted to the computer of a program control robotic center. The headlamp is placed by its reference points on a template, the positions of the connection points on the housing of the headlamp are determined by measurement and also transmitted to the computer of the program control robotic center. In the computer of the robotic center, during the required tolerance equalization, the corrected positions of the connection points on the mounting support are calculated. At the connection points, a robot brings up thrust pads belonging to thrust elements to the mounting support and they are inserted at a depth corresponding to the corrected positions of the connection points. The method of mounting of a headlamp according to DE102004005978 is complicated and its precision is not adequate.

SUMMARY OF THE INVENTION

In an exemplary embodiment, a method of manufacture of a lighting device comprising a body of headlamp or rear light of a motor vehicle that comprises a housing enclosed by a transparent cover is disclosed. The method includes steps wherein: 1) the body of the lighting device is clamped in a fixture and a set of actual positions of control points of the transparent cover or control points of the housing are measured in three coordinate axes; 2) the set of measured actual positions of the control points are compared in a three-dimensional model of the lighting device with a respective calculated tolerance space of control points bounded by permissible deviations from nominal positions of the control points of the lighting device; 3) in the event that the set of actual positions of the control points does not match up in all the control points within the calculated tolerance space of control points, a set of corrected positions of the control points with a spatial arrangement which is congruent to the set of actual positions of the control points and which falls by all control points within the required tolerance space of the control points is identified and selected; 4) for the chosen set of corrected positions of the control points in the three-dimensional model of the lighting device, determining corresponding corrected positions of the associated locating elements for attachment of the lighting device to a vehicle frame; and 5) the locating elements are mechanically, thermally, or chemically joined to the housing of the lighting device in the ascertained corrected positions.

The goal of the invention is to optimize the position of the headlamp with respect to the vehicle frame so that the gap between the lighting device and the frame of the motor vehicle is within the required tolerance range and as even as possible. Another goal of the invention is to enable an adjustment and correction of the position of the lighting device in all three coordinate axes, vertical, horizontal, and longitudinal axis of the vehicle. Another goal of the invention is to ensure the joining of the lighting device and the vehicle frame by simple and universal means. Another goal of the invention is that, after the lighting device has been mounted on the vehicle frame, no further adjustment of its position in the vehicle frame is necessary. Finally, the goal of the invention is for the manufacture of the lighting device and its fastening to the vehicle frame to be easier overall and allow for the use of alternative connection means.

These and other advantages and features will become more apparent from the following description taken in conjunction with the drawings.

BRIEF DESCRIPTION OF THE DRAWINGS

The method of manufacture of the lighting device which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
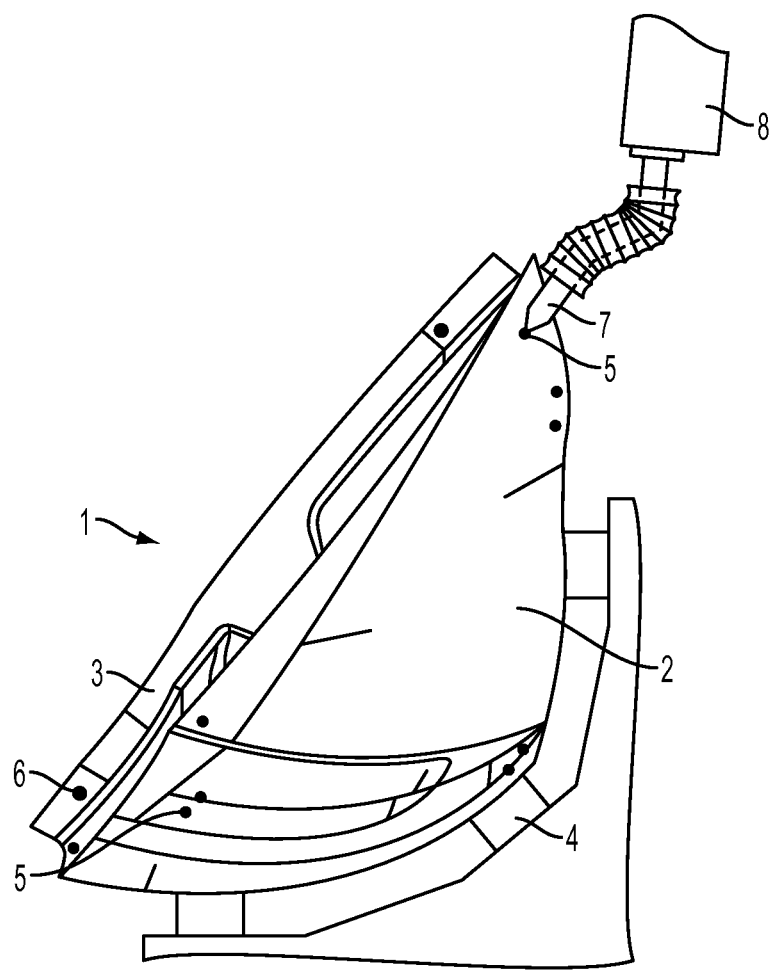
FIG. 1 is a view of the cover of the lighting device in the fixture.

The drawbacks of the prior art are eliminated to a substantial degree and the goals of the invention are fulfilled by the method of manufacture of a lighting device, especially the headlamp or rear lights of motor vehicles, whose housing with the light source is enclosed by a transparent cover, which according to the invention encompasses the series of steps: 1) the body of the assembled lighting device is clamped in a fixture and the actual positions of the control points of the transparent cover or the control points of the housing are measured in three coordinate axes; 2) the set of measured actual positions of the control points is compared in a three-dimensional model of the lighting device with the tolerance space of control points bounded by the permissible deviations from the nominal positions of the control points of the lighting device; 3) in the event that the set of actual positions of the control points does not match up in all the control points with the calculated tolerance space of control points; 4) one searches for and selects a set of corrected positions of the control points with a spatial arrangement which is congruent to the set of actual positions of the control points and which falls by all control points within the required tolerance space of the control points; 5) for the chosen set of corrected positions of the control points in the three-dimensional model of the lighting device one determines corresponding corrected positions of the associated locating elements for attachment of the lighting device to the vehicle frame; and 6) the locating elements are mechanically, thermally, or chemically joined to the housing of the lighting device in the ascertained corrected positions.

Advantageously, one selects as the tolerance space the space bounded by the maximum permissible deviation of 2 mm from the nominal position of the control points. Advantageously, such a set of corrected positions of the control points is chosen whose control points on the circumference of the transparent cover or housing have less than a predetermined deviation from the nominal position. Advantageously, for the mechanical joining of the locating element to the housing, one drills an opening in the locating surface of the housing for screwing the locating element in the corrected position and the locating element formed by a spherical head made as a single piece with a shaft having a hexagon shape and terminating in a thread is screwed into the opening of a locating boss of the housing. Advantageously, for the mechanical joining of the locating element to the housing, one drills an opening in the locating surface of the housing for flush installation of the locating element in the corrected position and the locating element formed by a spherical head made as a single piece with a shaft terminating in a cylindrical part is press-fitted into the opening of a locating boss of the housing. Advantageously, for the thermal joining of the locating element to the housing, the locating element formed by a spherical head made as a single piece with a shaft terminating in a cylindrical shoulder in the corrected position is applied by a connecting surface to the locating surface of a locating boss of the housing and under heating and simultaneous partial melting of plastic material the locating element is joined to the locating boss of the housing.

The method of manufacture according to the invention accomplishes high precision of placement of the lighting device in the vehicle frame, and all the statistical control points of the lighting device manufactured according to the invention lie in the required tolerance field. When using a process control robot, one can repeatedly install the positions of the individual locating elements with precision as good as ±0.1 mm. One can therefore fulfill the precision requirements on the part of the purchasers of lighting devices who are installing the lighting devices in the frame of a vehicle. Adjustment and correction of the position of the lighting device is possible in all three coordinate axes. The fastening of the locating elements on the housing of the lighting device can be done mechanically, thermally or chemically, while all methods of fastening are reliable and resistant to vibration.

In one embodiment, the mechanical connection of the locating element to the housing makes possible a screwing of the locating element to the housing in the corrected position. In another embodiment, the mechanical connection of the locating element to the housing makes possible a press fitting of the locating element in the housing in the corrected position. In yet another embodiment, the thermal connection of the locating element to the housing makes possible a thermal bonding of the locating element to the housing in the corrected position. The locating elements are made of hard plastic or metal and most often they are formed with a spherical head designed as a single piece with a shaft, which is provided with means for connection to the housing in the place of the so-called locating surface and for orientation in a specified position. The means for connection of the locating element to the housing can be a cylindrical or threaded part of the shaft, by which the shaft is screwed or press-fitted into a previously drilled opening in the locating surface of the housing or a cylindrical bearing shoulder of the shaft, which is heat sealed or chemically bonded to the housing in the place of the locating surface.

The method of manufacture of the lighting device according to the invention is very universal and can be used for correcting dimensional deviations in a broad range of lighting devices, especially for headlamps and rear lights of motor vehicles. The method of manufacture of the lighting device according to the invention allows the use of simple and universal connecting means for the connection to the frame.

Referring now to the Figures, where the invention will be described with reference to specific embodiments, without limiting same, according to FIG. 1, the lighting device 1 consists of a plastic housing 3 with light source (not shown) and a transparent cover 2, which closes the plastic housing 3 and is bonded to it or joined to it by heat seal along the circumferential line. The transparent cover 2 of the lighting device 1 has the shape of a general three-dimensional surface. The circumferential line of the transparent cover 2 delimits the maximum dimensions of the lighting device 1. On the circumferential line of the cover 2 are situated control points 5 and on the housing 3 are situated control points 6 for control of the actual position of the transparent cover 2, making possible a determination or control of the actual position in the longitudinal, transverse, and perpendicular direction. According to FIG. 1, the lighting device 1 is mounted by its transparent cover 2 on bearing surfaces of a fixture 4 in a stable position. The positions of the control points 5, 6 are ascertained or verified by a contact sensor 7 of a robotic arm of a robotic tool 8 controlled by a computer (not shown).

Figure 2:
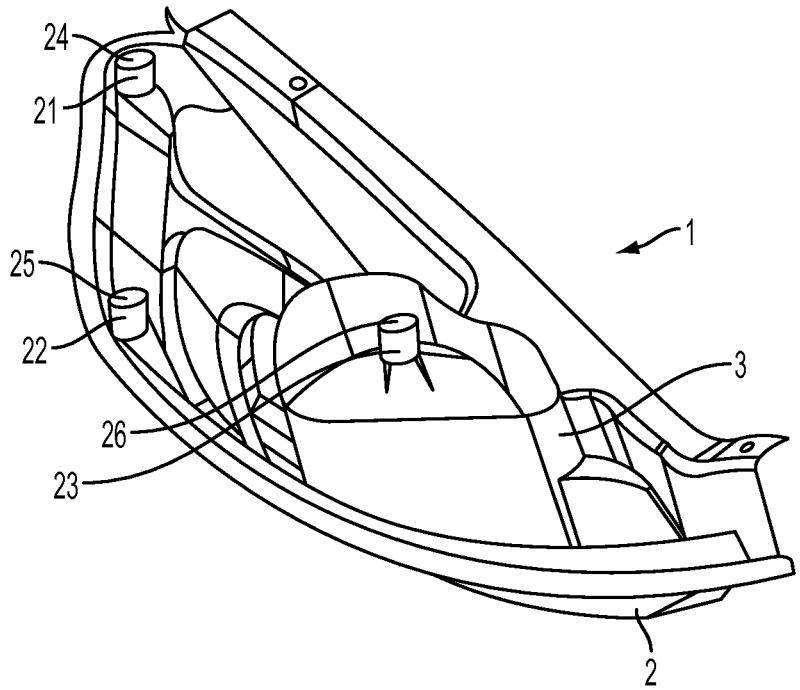
FIG. 2 is a view of the housing of the lighting device without locating elements.

According to FIG. 2, the housing 3 of the lighting device 1 on the side facing away from the transparent cover 2 is provided with locating bosses 21, 22, 23, by means of which the lighting device 1 is secured to the frame of a motor vehicle. The locating bosses 21, 22, 23 of the housing 3 advantageously have a cylindrical shape with end locating surfaces 24, 25, 26, which serve for mounting the locating elements illustrated in FIG. 3.

Figure 3:
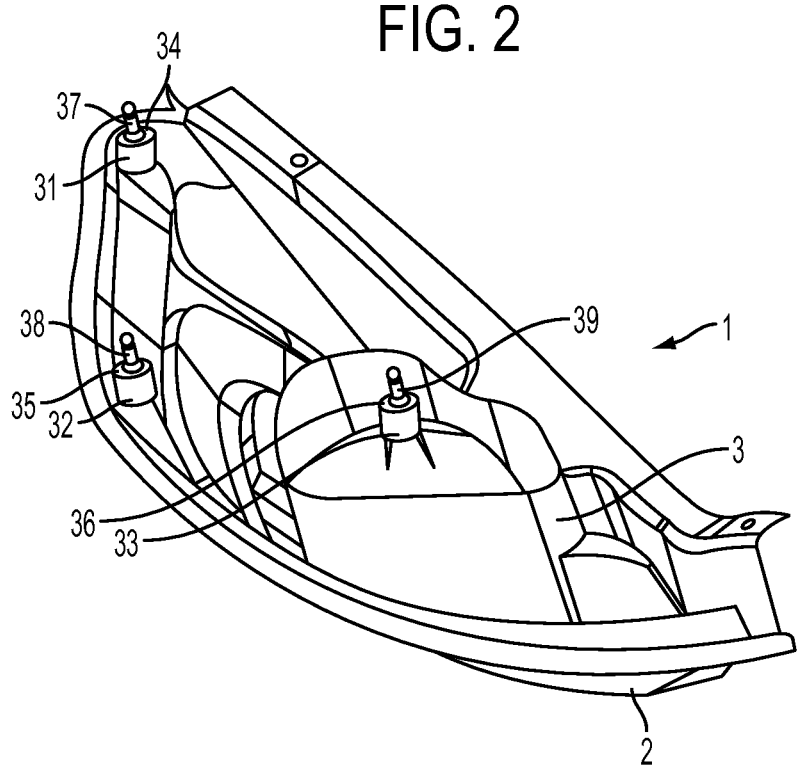
FIG. 3 is a view of the housing of the lighting device with locating elements.

In FIG. 3, locating elements 37, 38, 39 are secured to the end surfaces 34, 35, 36 of the locating bosses 31, 32, 33 of the housing 3. The position of the locating elements 37, 38, 39 need not be in the axis of the locating bosses 31, 32, 33, since this position according to the method of manufacture according to the invention is corrected prior to joining the locating elements 37, 38, 39 to the locating bosses 31, 32, 33 of the housing 3. The locating boss 31, 32, 33 has a sufficiently large end locating surface so that the correction of the position -a- does not result in the position of the locating element being outside the locating boss 31, 32, 33 or the end locating surface.

Figure 4:
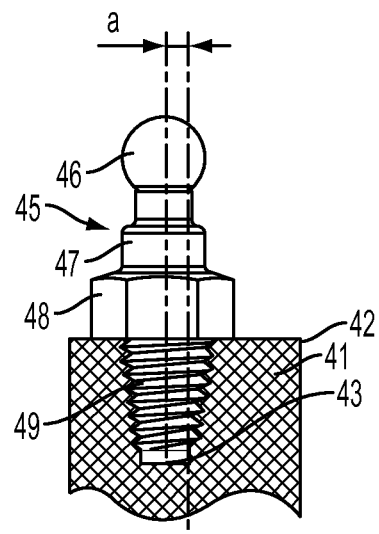
FIG. 4 is a section through a locating element, screwed into the locating boss.

According to FIG. 4, the locating element 45 formed with a spherical head 46, a shaft 47, a hexagon 48 and terminating in an external thread 49 is screwed in the corrected position, in the present case eccentrically with respect to the axis of the locating boss 41, into a locating borehole 43 produced in the locating boss 41 with eccentricity -a- from its axis.

Figure 5:
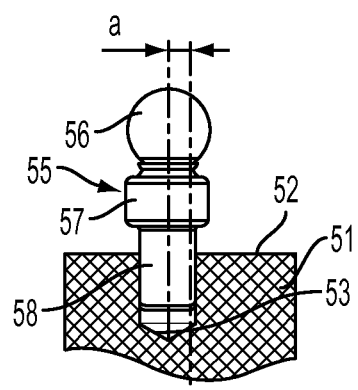
FIG. 5 is a section through a locating element press fitted into the locating boss.

According to FIG. 5, the locating element 55 formed with a spherical head 56, a shaft 57, and terminating in a cylindrical part 58 is press fitted in the corrected position, in the present case eccentrically with respect to the axis of the locating boss 51, into a locating borehole 53 produced in the locating boss 51 with eccentricity -a- from its axis.

Figure 6:
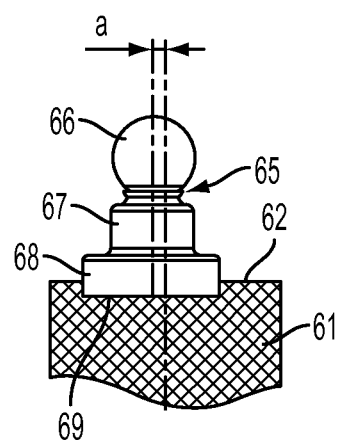
FIG. 6 is a section through a locating element thermally connected to the locating boss.

According to FIG. 6, the locating element 65 formed with a spherical head 66 made as a single piece with a shaft 67 terminating in a cylindrical shoulder 68 after heating and simultaneous partial melting of the plastic material is bonded in the corrected position, in the present case eccentrically with respect to the axis of the locating boss 61, to the locating boss 61 with eccentricity -a- from its axis. The locating element 65 is heated by known means in the region of the locating surface 69, such as by ultrasound vibrations, and applied by its butt surface 69 to the locating surface 62 of the locating boss 61 of the housing 3, the butt surface 69 of the cylindrical shoulder 68 being partly melted.

According to the method of manufacture of a lighting device according to the invention, the body of the assembled lighting device 1 is first of all secured to a processing fixture 4 and the actual positions of the control points 5, 6 of the transparent cover 2 and housing 3, respectively, are measured in three coordinate axes. The control points 5, 6 on the transparent cover 2 or housing 3 are present in sufficient number to enable a characterizing of the position of the lighting device 1 sufficiently accurately in all three spatial axes. The set of measured actual positions of the control points 5, 6 in a three-dimensional model of the lighting device 1 is compared with the tolerance space of control points 5, 6, bounded by permissible deviations from the nominal positions of the control points 5, 6 of the lighting device 1. The set of control points 5, 6 in the three-dimensional model of the lighting device 1 is coordinated with the spatial nominal positions of the locating elements 21, 22, 23. In the event that the set of measured actual positions of the control points 5, 6 falls within the three-dimensional tolerance space of control points, the locating elements 37, 38, 39, 45, 55, 65 are joined to the housing 3. In the event that the set of measured actual positions of the control points 5, 6 does not fall by all control points 5, 6 within the calculated tolerance space of control points 5, 6, a set of corrected positions of the control points 5, 6 is found with a spatial arrangement similar to the set of actual positions of the control points 5, 6, which falls by all control points 5, 6 within the required tolerance space of control points 5, 6. The selection of the set of corrected positions is done, for example, by the method of spatial regression analysis, whose goal is to ideally coordinate the nominal coordinates of the control points with the set of measured actual positions of the corresponding control points. The result of this coordination is a shifting of the entire set of points in space. For the selected set of corrected positions of the control points 5, 6 in the three-dimensional model of the lighting device 1 one determines corresponding corrected positions of the coordinated locating elements 37, 38, 39 for fastening the lighting device 1 to the frame of the vehicle. The relation between the control points 5, 6 and the locating elements 37, 38, 39 is given by the positions of the control points and the positions of the locating elements 37, 38, 39 in the spatial model of the lighting device 1, specifically the spatial model of the cover 2 and housing 3 of the lighting device 1. The shifting of the entire set of control points 5, 6 in space produces length and angle deviations in the locating elements 37, 38, 39. These deviations can be calculated. The angle and length difference between the original position of the locating elements in a CAD spatial model and the position of the locating elements after coordinating the nominal positions of the control points 5, 6 on the cover with the set of measured actual positions of the control points 5, 6 is calculated. The calculated difference is used to correct the approach vector and position of the terminal link of the robot (the robot effector) of a robotic tool 8 for machining of the plastic housing 3 in the locations of the locating surfaces 24, 25, 26. The result is the corrected position of the locating elements 37, 38, 39, which is at an ideal distance and inclination with respect to the set of measured actual positions of the control points 5, 6. As the tolerance space, one advantageously selects a space bounded by a permissible deviation of 2 mm from the nominal position of the control points. Advantageously, one can select such a set of corrected positions of control points 5, 6 having along the circumference of the transparent cover 2 or housing 3 a less than predetermined deviation from the nominal position. A greater precision for the position of the locating elements with respect to the selected control points can be achieved by controlling the precision of coordination of the individual control points. Fixed and repeated mounting of the cover 2 in the fixture is one of the ways of increasing the significance of the control points to a maximum and thereby refining the position of the locating elements with respect to them. In the case of controlled significance of the selected control points, one must take into account that refining of the position of the locating elements with respect to selected significant control points will worsen the position of the locating elements with respect to less significant control points. The spherical head of the locating element is then shifted from the nominal position to the corrected position in which the dimensional variability of the lamp will fall within the required tolerance field and will have a homogeneous distribution of deviations around the entire circumference of the lamp and with respect to the frame of the motor vehicle. In the next step, the locating elements are joined to the housing of the lighting device either mechanically, thermally or chemically in the ascertained corrected positions, as indicated in FIG. 4, 5, 6. For a mechanical connection of the locating element to the housing, one uses a locating element configured with a spherical head made as a single piece with a shaft provided with a thread for screwing or a cylindrical surface for press fitting in the housing and in the locating surface of the housing one drills an opening corresponding to the screwing or the press fitting of the locating element in the corrected position. Before joining the locating elements by mechanical method to the plastic housing in the locations of the riser locating bosses, one drills a borehole in the corrected positions for mounting of the locating elements. For thermal connection of a locating element to the housing, one uses a locating element formed with a spherical head made as a single piece with a shaft terminating in a locating surface, wherein the locating surface of the locating element and the locating surface of the housing are joined by melting during simultaneous partial melting of the plastic material of the locating surface of the housing. Before joining the locating elements by thermal method, the plastic housing in the locations of the riser locating bosses is machined by melting, for example, by means of ultrasound vibrations. The method of manufacture of a lighting device according to the invention ensures a correct and accurate mounting in the frame and in covers and housings whose dimensions have a dimensional difference, which thus far has prevented a correct and accurate mounting. The method of manufacture of lighting devices achieves high precision of the positions of the individual locating elements. In the event of using a process control robot, one can repeatedly install locating elements with an accuracy of up to ±0.1 mm. The position of the spherical heads of the locating elements of the lighting device is corrected so as to compensate for the manufacturing imprecision of the body of the lighting device.

The joining of the locating elements by the method of the invention, given the universality of a robotic work station, is predestined for the correction of the dimensional variability of any given lighting device, including headlamps and lights. It is also considered useful for establishing the position of a lighting device with an accuracy of up to ±0.1 mm.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A method of manufacture of a lighting device comprising a body of a headlamp or rear light of a motor vehicle that comprises a housing enclosed by a transparent cover, comprising steps, wherein:

the body of the lighting device is clamped in a fixture and a set of actual positions of control points of the transparent cover or control points of the housing are measured in three coordinate axes;

the set of measured actual positions of the control points are is compared in a three-dimensional model of the lighting device with a respective calculated tolerance space of control points bounded by permissible deviations from nominal positions of the control points of the lighting device;

in the event that the set of actual positions of the control points does not match up in all the control points within the calculated tolerance space of control points, a set of corrected positions of the control points with a spatial arrangement which is congruent to the set of actual positions of the control points and which falls by all control points within the required tolerance space of the control points is identified and selected;

for the chosen set of corrected positions of the control points in the three-dimensional model of the lighting device, determining corresponding corrected positions of the associated locating elements for attachment of the lighting device to a vehicle frame; and the locating elements are mechanically, thermally, or chemically joined to the housing of the lighting device in the ascertained corrected positions.

2. The method of manufacture of a lighting device according to claim 1, wherein one selects as the tolerance space the space bounded by a maximum permissible deviation of 2 mm from the nominal positions of the control points.

3. The method of manufacture of a lighting device according to claim 1, wherein the set of corrected positions of the control points is chosen whose control points on the circumference of the transparent cover or housing have less than a predetermined deviation from the nominal position.

4. The method of manufacture of a lighting device according to claim 1, wherein mechanical joining of the locating elements to the housing comprises drilling openings in the locating surfaces of locating bosses in the corrected positions and screwing the locating elements into the openings.

5. The method of manufacture of a lighting device according to claim 4, wherein the locating elements each comprise a spherical head made as a single piece with a shaft having a hexagon shape and terminating in a threaded portion for screwing into the openings of the locating bosses of the housing.

6. The method of manufacture of a lighting device according to claim 1, wherein mechanical joining of the locating elements to the housing comprises drilling openings in the locating surfaces of locating bosses in the corrected positions and press-fitting the locating elements into the openings.

7. The method of manufacture of a lighting device according to claim 6, wherein the locating elements each comprise a spherical head made as a single piece with a shaft terminating in a cylindrical part for press-fitting into the openings of the locating bosses of the housing.

8. The method of manufacture of a lighting device according to claim 1, wherein thermal joining of the locating elements to the housing comprises heating and simultaneous partial melting of a plastic material of the locating elements and joining the locating elements to locating bosses of the housing.

9. The method of manufacture of a lighting device according to claim 8, wherein the locating elements each comprise a spherical head made as a single piece with a shaft terminating in a cylindrical shoulder for joining to the locating bosses of the housing.

* * * * *